United States Patent
Yamamoto

(10) Patent No.: US 6,938,660 B2
(45) Date of Patent: Sep. 6, 2005

(54) PNEUMATIC TIRE

(75) Inventor: Emiko Yamamoto, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 10/505,962

(22) PCT Filed: Mar. 26, 2003

(86) PCT No.: PCT/JP03/03749
§ 371 (c)(1),
(2), (4) Date: Aug. 27, 2004

(87) PCT Pub. No.: WO03/082609
PCT Pub. Date: Oct. 9, 2003

(65) Prior Publication Data
US 2005/0103419 A1 May 19, 2005

(30) Foreign Application Priority Data
Mar. 29, 2002 (JP) ........................................ 2002-096305

(51) Int. Cl.⁷ .............................. B60C 9/04; B60C 9/00
(52) U.S. Cl. ...................................... 152/556; 152/557
(58) Field of Search .................................. 152/556, 557

(56) References Cited

U.S. PATENT DOCUMENTS

| 5,730,815 A | 3/1998 | Sakamoto et al. |
| 2003/0062108 A1 * | 4/2003 | Bernstorf et al. ............ 152/556 |

FOREIGN PATENT DOCUMENTS

| EP | 1 066 940 A2 | 1/2001 |
| JP | 5-338403 A | 12/1993 |
| JP | 10-6708 A | 1/1998 |

* cited by examiner

Primary Examiner—Adrienne C. Johnstone
(74) Attorney, Agent, or Firm—Birch, Stewart, Kolasch & Birch, LLP

(57) ABSTRACT

A pneumatic tire, comprising a carcass having a carcass ply (6a) with a folded part (6b) folded up around a bead core (5) from the axial inside to the axial outside of the tire continuously fitted to a ply body part (6a) installed across the bead cores (5) and (5), wherein the intermediate elongation (Es) of a carcass cord in the ply body part (6a) at the maximum width position (M) is smaller than the intermediate elongation (Eb) thereof at the height position (B) of the bead core at the radial outermost end of the tire.

8 Claims, 4 Drawing Sheets

PNEUMATIC TIRE

TECHNICAL FIELD

The present invention relates to a pneumatic tire capable of enhancing, in excellent balance, basic performance of a tire such as steering stability, riding comfort, noise performance.

BACKGROUND TECHNIQUE

In order to enhance the steering stability of a pneumatic tire, it is effective to enhance a flexural rigidity of a sidewall portion. For this purpose, a high modulus carcass cord is used to form a bone of the tire, or a bead apex rubber disposed in the bead portion and having a triangular cross section is increased in size.

Such a method is effective for enhancing the steering stability, but since a vertical rigidity of the tire is also increased, the riding comfort is deteriorated. In recent years, it has been found from various experiments that if the height of the bead apex rubber is increased to increase the vertical rigidity, road noise performance (noise inside the vehicle) is deteriorated, and especially the noise performance in a low frequency band of about 100 to 160 Hz is deteriorated.

The present inventors carried out various experiments to enhance, in excellent balance, basic performance of a tire such as steering stability, riding comfort, noise performance. As a result, they found that if intermediate elongations of carcass cords are made different in each portion of the tire, more specifically, if intermediate elongations Es at a maximum width position where a ply body portion of a carcass projects most outward in the tire axial direction are made smaller than intermediate elongation Eb at a height position of a radially outermost end of the bead core, the basic performance of the tire can be enhanced in excellent balance.

That is, it is an object of the present invention to provide a pneumatic tire capable of enhancing, in excellent balance, basic performance of a tire such as steering stability, riding comfort, noise performance.

DISCLOSURE OF THE INVENTION

To achieve the above object, the present invention provides a pneumatic tire, comprising a carcass including a carcass ply having a ply body portion which extends from a tread portion to a bead core of a bead portion through a sidewall portion and which is continuously provided with a ply folded-up portion folded up around the bead core from its inner side to its outer side in the tire axial direction, wherein an intermediate elongation Es of a carcass cord in the ply body portion at a maximum width position where the ply body portion projects most outward in a tire axial direction is smaller than an intermediate elongation Eb at a height position of a radially outermost end of the bead core.

It is preferable that a ratio (Es/Eb) of the intermediate elongation Es at the maximum width position and the intermediate elongation Eb at the height position of the outermost end is 0.7 or greater and 0.9 or smaller.

It is preferable that a bead apex rubber extending radially outward of the tire from the bead core is disposed in the bead portion, a height (ha) of the bead apex rubber from a bead base line is 0.3 to. 1.0 times a height (h) from the bead base line to the maximum width position.

It is preferable that a tire thickness (Ts) at the maximum width position of the carcass ply is 30 to 67% of a tire thickness Tb at the height position of the outermost end.

It is preferable that the carcass cord is a polyester cord, the intermediate elongation Es is 3.0 to 5.0%.

Here, the "intermediate elongation" of the carcass cord is an elongation ratio when a constant load is applied, which is measured in accordance with "normal time test" described in Section 7.7.1 of JIS L1017. The constant load is determined by the following equation:

Constant load($kgf$)=4.5×(displayed denier of sample/reference denier of cord)

A tire is disassembled and a carcass cord removed from the disassembled tire is used as the test material. When the intermediate elongation Es is measured, a portion of the carcass cord located at the maximum width position is located at the center between grasping sections of a tensile testing machine. Similarly, when the intermediate elongation Eb is measured, a portion of the carcass cord located at the height position of the radially outermost end is located at the center between grasping sections of a tensile testing machine. Since a large number of carcass cords exist in the tire circumferential direction, in this specification, one carcass cord is selected from equal four locations on the circumference of the tire, the intermediate elongation of each of the selected carcass cord is obtained, and average value thereof is used. Rubbers adhered to peripheries of the carcass cords are carefully removed and then the test is carried out.

BEST MODE FOR CARRYING OUT THE INVENTION

An example of the present invention will be explained with reference to the drawings.

Figure 1:
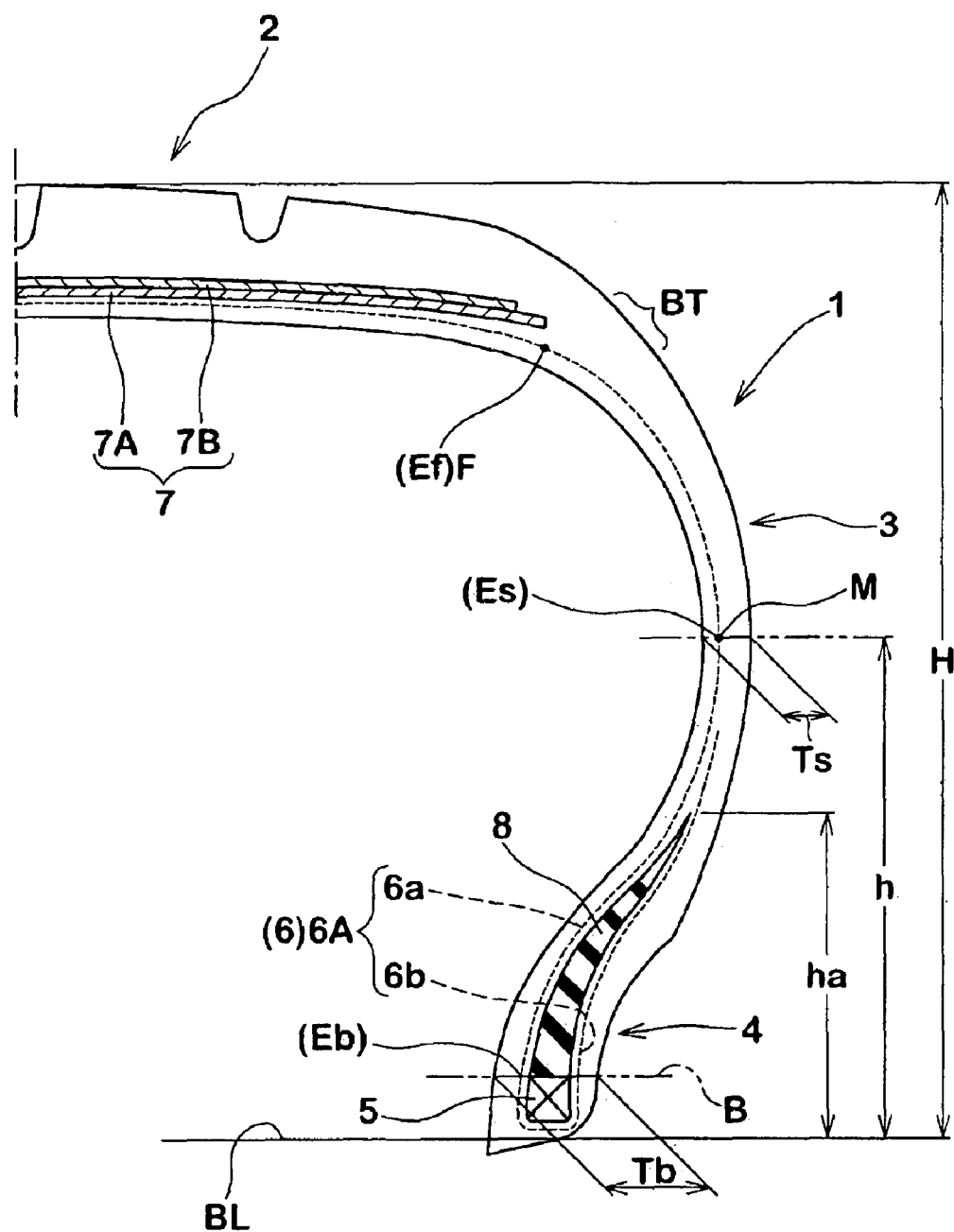
FIG. 1 is a sectional view of a right half of a pneumatic tire according to an embodiment of the present invention.

In FIG. 1, a pneumatic tire 1 includes a tread portion 2, a pair of sidewall portions 3 extending radially inward from opposite sides of the tread portion 2, and bead portions 4 located at inner ends of the sidewall portions 3. In this example, the pneumatic tire 1 is a radial tire for a passenger vehicle. The pneumatic tire 1 includes a toroidal carcass 6 extending from the tread portion 2 to the bead core 5 of the bead portion 4 through the sidewall portion 3, and a belt layer 7 disposed inward of the tread portion 2 and on the outer side of the carcass 6 in the radial direction of the tire.

The carcass 6 comprises one or more, in this example, one carcass ply 6A in which carcass cords are arranged at an angle of 75 to 90° with respect to the tire circumferential direction. The carcass ply 6A includes a ply body portion 6a extending between the bead cores 5 and 5, and a ply folded-up portion 6b which is connected to opposite sides of the ply body portion 6a and folded back from inside to outside around the bead core 5 in the tire axial direction.

A tire cord ply comprising carcass cords arranged in parallel to each other is used as the carcass ply 6A. The carcass cords are aligned as a cord and opposite surfaces are coated with topping rubber. As the carcass cord, it is possible to use organic fiber cord such as nylon, polyester, rayon, aromatic polyamide, and in this example, polyester cord is employed. A bead apex rubber 8 which extends outwardly in a tapered manner from a tire radially outer surface of the bead core 5 is disposed between the ply body portion 6a and the ply folded-up portion 6b. The bead apex rubber 8 appropriately reinforces the flexural rigidity of the bead portion 4.

The belt layer 7 comprises two or more, in this example, two belt plies 7A and 7B. The belt ply comprises belt cords which are inclined with respect to the tire circumferential direction at an angle of 10 to 35°. The belt cords intersect with each other between the belt plies 7A and 7B, thereby exhibiting the hoop effect. A steel cord is suitable as the belt cord, but high elastic organic fiber cords such as aromatic polyamide fiber and aromatic polyester fiber can also be used.

In the present invention, intermediate elongations of the carcass cords in the ply body portion 6a of the carcass ply 6A are different in each portion of the tire.

More specifically, an intermediate elongation Es of the carcass cord at a maximum width position M where the ply body portion 6a projects most outward in the tire axial direction is set smaller than an intermediate elongation Eb of the carcass cord at a height position B of an outermost end of the bead core 5 in the radial direction of the tire. In FIG. 1, the symbols Es and Eb of the intermediate elongations are parenthesized at corresponding positions to facilitate the understanding.

In this embodiment, a height (h) of the maximum width position M from a bead base line BL is 0.48 to 0.52 times a height H of the tire cross section.

In this specification, unless otherwise specified, the maximum width position (M), positions of the tire including the height position B of the outermost end, and sizes of various portions including the heights (h) and (H) are values specified in a normal state (no load is applied) that the tire is assembled to a normal rim (not shown) and normal internal pressure is charged into the tire.

Here, the "normal rim" is a rim determined for each tire by a standard including one on which the tire is based, and the normal rim is a standard rim in the case of JATMA, a "Design Rim" in the case of TRA, and a "Measuring Rim" in the case of ETRTO. Further, "normal internal pressure" means an air pressure determined for each tire by a standard. The "normal internal pressure" is a maximum air pressure in JATMA, a maximum value described in "TIRE LOAD LIMITS AT VARIOUS COLD INFLATION PRESSURES" in the case of TRA, and "INFLATION PRESSURE" in the case of ETRTO. When the tire is for a passenger vehicle, the normal internal pressure is 180 KPa.

As a result of the experiments carried out by the present inventors, it was found that an intermediate elongation Es of a carcass cord at the maximum width position M of a conventional pneumatic tire is equal to or greater than an intermediate elongation Eb of an radially outermost end of the bead core 5 at the height position B. Normally, the maximum width position M is located at a substantially center of the sidewall portions 3, and no reinforcing material other than the carcass ply is disposed (in the tire of the present embodiment also, a reinforcing material other than the carcass ply and rubber is not disposed at the maximum width position M). For this reason, in the conventional pneumatic tire, a load supporting ability or a lateral rigidity of the sidewall portion 3 is determined by the carcass cord having great intermediate elongation Es. According to such a structure, since the elongation of the carcass cord at the sidewall portion 3 becomes great, the lateral rigidity is reduced and the steering stability is deteriorated.

Thereupon, the distribution of the intermediate elongations of the carcass cords is totally different from that of the conventional technique. That is, the intermediate elongations are set such that a relation Es<Eb is established. With this, the load supporting ability of the carcass cord in the sidewall portion 3 can be enhanced around the maximum width position M, and the lateral rigidity and cornering power are enhanced without increasing the tire weight. That is, the original performance of the carcass cord can be exhibited to the utmost. Further, by relatively increasing the intermediate elongation Eb at the position B of the bead portion, it is possible to prevent the vertical rigidity from increasing, and to prevent the riding comfort and the road noise performance from being deteriorated. The intermediate elongations Es and Eb of the carcass cords are only for the ply body portion 6a of the carcass ply 6A. This is because that the ply body portion 6a substantially determines the vertical rigidity of the tire, the lateral rigidity and the load supporting ability, but the involvement of ply folded-up portion 6b in the determination is relatively small.

Here, a ratio (Es/Eb) of the intermediate elongation Es and the intermediate elongation Eb is smaller than 1. If this ratio is excessively great, the enhancing effect of the steering stability becomes relatively small. If the ratio is excessively small, the vertical rigidity of the sidewall portion 3 becomes excessively high, or the bending endurance of the bead portion 4 is deteriorated. From such a view point, although it is not especially limited, it is preferable that the ratio (Es/Eb) of the intermediate elongations is higher than 0.7 and smaller than 0.9, more preferably in a range of 0.75 to 0.85, and more preferably 0.75 to 0.80.

A polyester cord is used as the carcass cord in this embodiment. In this case, it is preferable that the intermediate elongation Es is about 3.0 to 5.0%. Especially in the case of polyester cord having total denier of 3000 dtex or higher such as 1670 dtex/2, 1100 dtex/3 or 1100 dtex/2/2, it is preferable that the intermediate elongation Es is 3.2 to 4.8%, more preferably 3.3 to 4.5%. In the case of polyester cord having total denier of 3000 dtex or less such as 1100 dtex/2, it is preferable that the intermediate elongation Es is 4.0 to 6.5%, more preferably 4.2 to 5.5%. As a result of experiments carried out by the present inventors, it is found that when a rayon cord (e.g., 1840 dtex/2) is used as the carcass cord, it is preferable that the intermediate elongation Es is 3.5 to 5.5%, more preferably 4.0 to 5.0%.

Attention is now focusing on the distribution of the intermediate elongations of the carcass cords in a region from a position F of the outer end of the belt layer 7 to the position B of the bead portion 4 through the maximum width position M. It is preferable that the intermediate elongation is smoothly increased from the position F to the position B. That is, if the intermediate elongation in the position F is defined as Ef, it is preferable that a relation Ef<Es<Eb is established. This is because that if the relation Ef<Es<Eb is established, in a buttress portion BT (shown in FIG. 1) which receives the greatest compression or contraction at the time of running under load, the elongation of the carcass cord can be reduced. With this configuration, the load supporting ability can be exhibited to the utmost. From such a viewpoint, it is preferable to set the intermediate elongation ratio Ef/Es to 0.6 to 0.95, more preferably 0.7 to 0.9. At that time, it is further preferable to set a ratio (Ef/Es)/(Es/Eb) of the ratio Ef/Es and the ratio Es/Eb to 0.80 to 1.20, more preferably 0.90 to 1.10 so that the variation of the intermediate elongation may be smoothened.

It is preferable to set the average value (Ef+Es+Eb)/3 of the intermediate elongations Ef to 3.0 to 5.0% which is smaller than that of the conventional tire, i.e., 5% or higher. With this, when a force applied to the tire is distributed to the carcass 6 and an auxiliary member such as the bead apex rubber 8, the distribution ratio of the carcass 6 can be increased. Thus, a force transmitted from a road surface to a steering wheel through a tread of the tire is not distributed to other members and is directly transmitted to the steering wheel. This is advantageous for handling performance.

In the case of the pneumatic tire 1 of the present invention, even if a height (ha) of the bead apex rubber 8 from the bead base line BL is set to a relatively great value in a range of 0.3 to 1.0 times, or more preferably 0.5 to 1.0 times the height (h) of the maximum width position M, it is possible to prevent the road noise performance from being deteriorated. In the case of the conventional pneumatic tire, if such a big bead apex rubber 8 is diposed in the bead core 5, the road noise performance (noise in the vehicle) is deteriorated, and especially the noise performance in the low frequency band of 100 to 160 Hz is deteriorated as described above.

However, in the pneumatic tire 1 of this embodiment, since the intermediate elongation of the carcass cord is limited as described above, the intermediate elongation of the carcass cord of the bead portion 4 is set relatively large. Therefore, even if the bead apex rubber 8 is increased in size, it is possible to prevent the rigidity of the bead portion 4 from excessively increasing. Thus, the deterioration of the road noise performance caused by upsizing the bead apex rubber 8 can be effectively prevented.

The tire thickness Ts of the pneumatic tire 1 at the maximum width position M of the sidewall portion 3 can be reduced to 30 to 67%, more preferably 30 to 50% of the tire thickness Tb at the position B of the bead portion 4. This is because that even if the thickness of the rubber portion at the maximum width position M is reduced, since the intermediate elongation of the carcass cord is limited to the small value, the steering stability is not deteriorated. If the thickness is reduced at the maximum width position M, rolling resistance can be reduced.

Figure 2A:
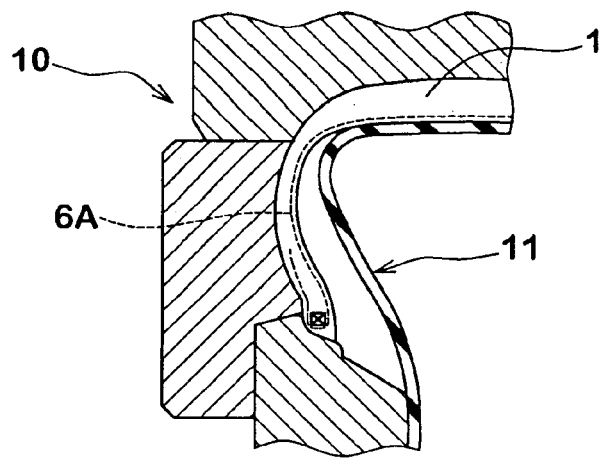
FIGS. 2(A) to 2(C) are diagrams showing one example of a producing method of the pneumatic tire of the embodiment.
Figure 2B:
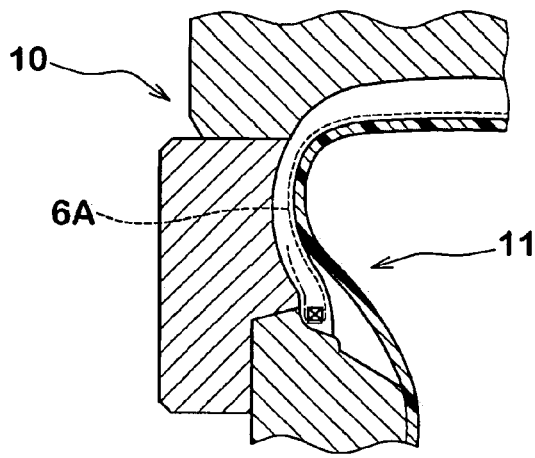
Figure 2C:
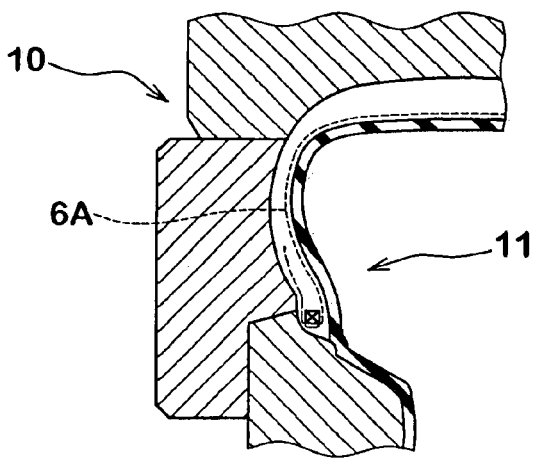

The pneumatic tire 1 having intermediate elongations of the carcass cords different from one part to another as in this embodiment can be produced by various methods. For example, as shown in FIGS. 2(A) to 2(C), there is a method in which when the tire is formed in a vulcanization molding manner by a metal mold 10, expansion shape of a bladder 11 which pushes the cavity surface is controlled. In this method, as shown in FIG. 2(A) first, the bladder 11 is substantially pushed only against the cavity surface of the tread portion 2 at initial stage of vulcanization, and the carcass cord around the buttress portion is allowed to extend more and subjected to vulcanization. Then, as shown in FIG. 2(B), the pushing region of the bladder 11 is expanded to the sidewall portion including the maximum width position M and the vulcanization is carried out. Thereafter, the pushing region of the bladder 11 is expanded to the bead portion. By adjusting the expansion and deformation of the bladder in this manner, the flow of rubber and expansion of the carcass cord caused by deformation of a raw cover can be controlled. That is, it is possible to produce the pneumatic tire 1 in which the elongation of the carcass cord is maximized on the side of the tread portion, the elongation is gradually reduced toward the maximum width position M and the position B of the bead portion, and the requirement of the intermediate elongation is satisfied.

As another method, in a so-called post cure inflation in which residual heat expansion is carried out after vulcanization, it is possible to produce a pneumatic tire satisfying the requirement of the intermediate elongation by applying tension in the same order as that of the above method. Alternatively, it is also possible to control the intermediate elongation of various portions by previously applying tension to a cord fabric of the carcass cord to carry out predetermined thermal processing prior to the vulcanization. The pneumatic tire of the present invention can be produced by various methods.

Although the embodiment of the present invention has been described in detail, the invention can also be applied not only to the pneumatic tire for the passenger vehicle, but also to various kinds of tires including a small truck tire, a heavy duty tire and a two-wheeled vehicle tire.

EMBODIMENTS

Passenger vehicle radial tires having size of 195/65R15 were prototyped based on the specifications shown in FIG. 1 and Table 1, and the following basic performance was measured and evaluated. The carcass comprises one carcass ply having polyester cord of 1670 dtex/2, and tensions of parts of the tire were made different at the time of vulcanization, thereby adjusting the intermediate elongations Es and Eb.

Figure 3:
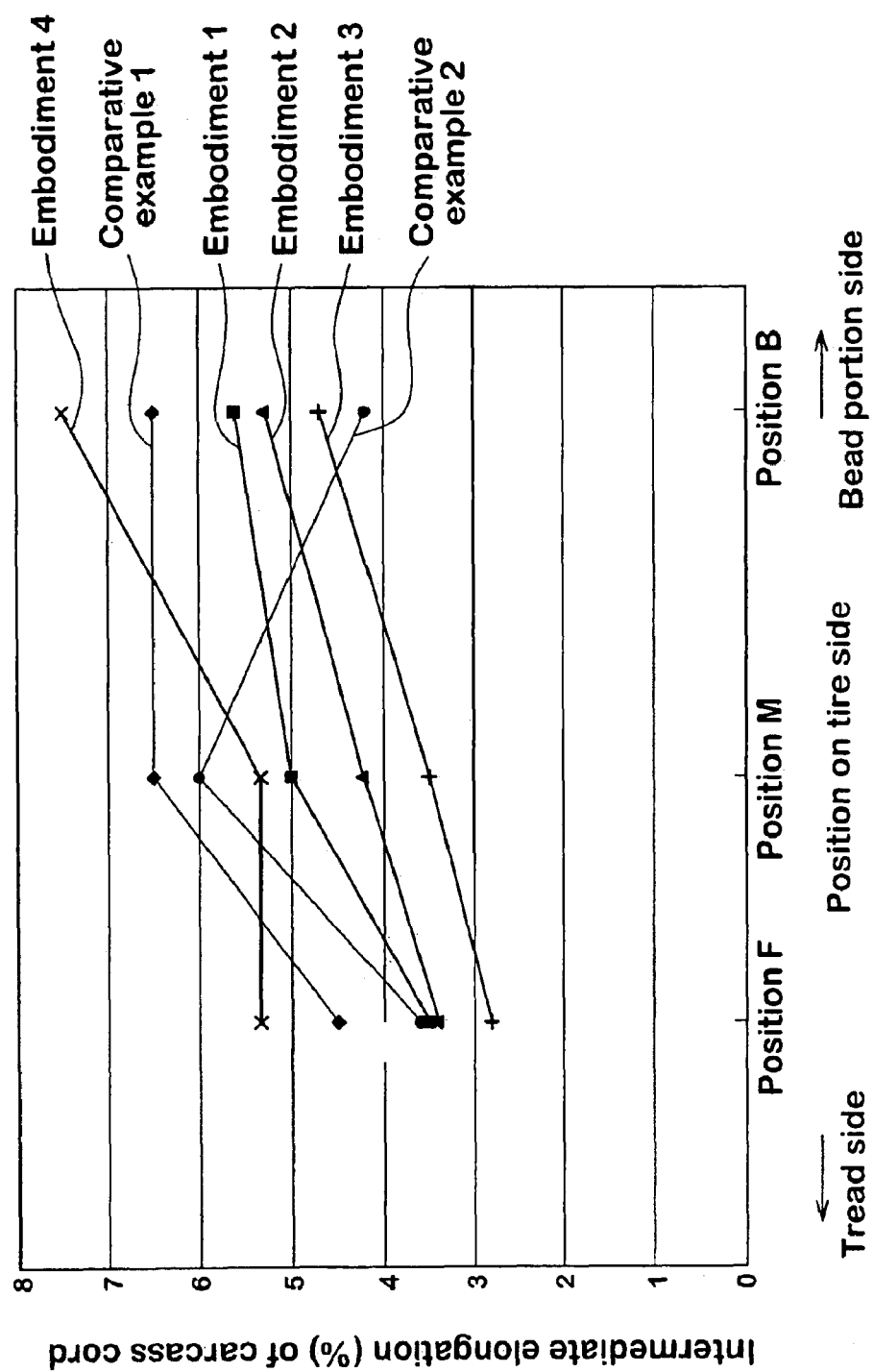
FIG. 3 is a graph showing distribution of intermediate elongations of carcass cord from a belt end position to a bead portion position of tires of examples 1 to 4 and tires of comparative examples 1 and 2 in Table 1.
Figure 4:
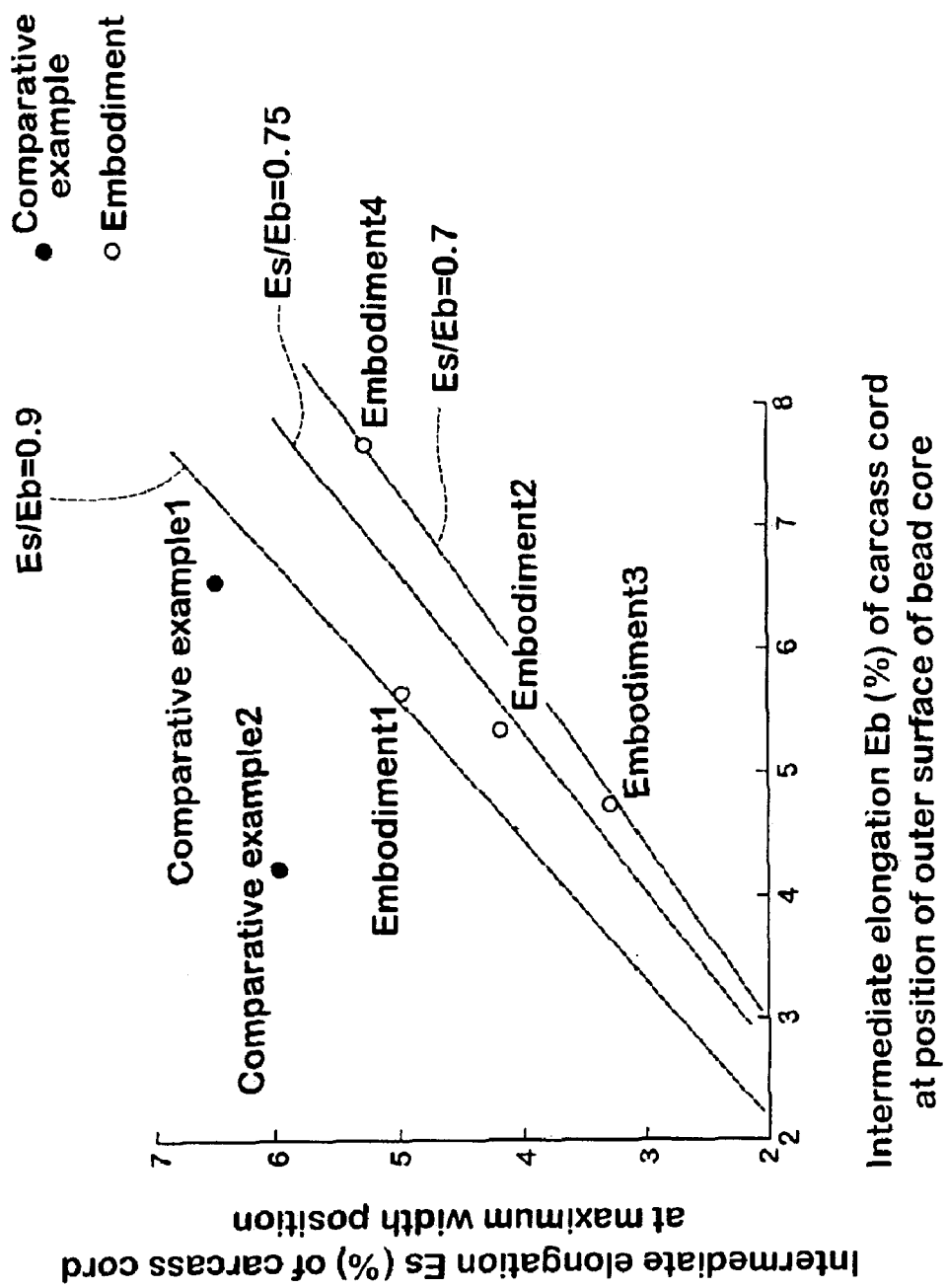
FIG. 4 is a graph on which values of intermediate elongations Es and Eb of the tire are plotted.

FIG. 3 shows distribution of the intermediate elongation E from the position F of the outer end of the belt layer to the position B of the bead portion of a tire of each of typical embodiments 1 to 4 and comparative examples 1 to 2. FIG. 4 shows values of the intermediate elongations Es and Eb at the positions M and B of the tire.

The test method is as follows:

<Steering Stability and Riding Comfort>

Prototyped tires were mounted on four wheels of a vehicle (FF vehicle having displacement of 2500 cc) under conditions of rim (15×6JJ) and internal pressure (210 kPa). Only one person was in the vehicle, the vehicle was run on a test course, and the steering stability and the riding comfort were evaluated by a driver's sensory evaluation on a scale of 10 while a comparative example 1 was defined as 6. A greater value indicates more excellent result.

<Road Noise Performance>

The vehicle was run on a dry rough asphalt road at a speed of 60 km/h, and overall nose level dB (A) was measured by a microphone set at a position closer to a left ear at a driver's seat. The noise level dB (A) is indicated as a noise difference with respect to the comparative example 1. Here, a symbol "−" (minus) shows a value lower than the conventional road noise.

<Lateral Spring>

A lateral spring constant of the prototyped tire was measured in a state of rim (15×6JJ), internal pressure (210 kPa), vertical load (4.27 kN), and was compared with an index 100 which was the comparative example 1. A greater value indicates higher lateral spring constant.

<Cornering Power>

Using an indoor testing machine, a cornering power when a slip angle was 1° in a state in which the tire was assembled to the rim and an internal pressure was applied was measured, and indicated using an index 100 which was the comparative example 1. A greater value indicates more excellent result. A result of the test is shown in Table 1.

TABLE 1

| | | Comparative example 1 | Embodiment 1 | Embodiment 2 | Embodiment 3 | Embodiment 4 | Comparative example 2 | Comparative example 5 | Comparative example 6 | Comparative example 7 | Comparative example 8 |
|---|---|---|---|---|---|---|---|---|---|---|---|
| Specifications of carcass cord | Material, denier | | | | | Polyester 1670 dtex/2 | | | | | |
| | Intermediate elongation Ef (%) at outer end of belt layer | 4.5 | 3.5 | 3.4 | 2.8 | 5.3 | 3.6 | 2.8 | 2.8 | 2.8 | 2.8 |
| | Intermediate elongation Es (%) at tire maximum width position | 6.5 | 5.0 | 4.2 | 3.5 | 5.3 | 6.0 | 3.5 | 3.5 | 3.5 | 3.5 |
| | Intermediate elongation Eb (%) at outermost end position of bead core | 6.5 | 5.6 | 5.3 | 4.7 | 7.6 | 4.2 | 4.7 | 4.7 | 4.7 | 4.7 |
| | Ratio (Ef/Es) | 0.7 | 0.7 | 0.8 | 0.8 | 1.0 | 0.6 | 0.8 | 0.8 | 0.8 | 0.8 |
| | Ratio (Es/Eb) | 1.00 | 0.89 | 0.79 | 0.75 | 0.70 | 1.43 | 0.75 | 0.75 | 0.75 | 0.75 |
| Height ha/h of bead apex | | 0.7 | 0.7 | 0.7 | 0.7 | 0.7 | 0.7 | 0.2 | 1.2 | 0.7 | 0.7 |
| Thickness Ts/Tb at tire maximum width position | | 0.6 | 0.6 | 0.6 | 0.6 | 0.6 | 0.6 | 0.6 | 0.6 | 0.3 | 0.9 |
| Result of test | Steering stability (on a scale from 1 to 10) | 6 | 6 | 7 | 8 | 6 | 5 | 4 | 7 | 5 | 5 |
| | Riding comfort (on a scale from 1 to 10) | 6 | 6 | 6 | 7 | 7 | 6 | 5 | 5 | 6 | 5 |
| | Road noise performance | Reference | −0.6 | −0.8 | −1.2 | −0.2 | +1.2 | −1.0 | +0.6 | −0.5 | +0.5 |
| | Lateral spring | 100 | 103 | 107 | 105 | 101 | 95 | 90 | 105 | 93 | 103 |
| | Cornering power (index) | 100 | 103 | 107 | 105 | 100 | 95 | 95 | 103 | 97 | 102 |

INDUSTRIAL APPLICABILITY

According to the pneumatic tire of the present invention, the intermediate elongation Es of the carcass cord at the maximum width position in the ply body portion of the carcass is set smaller than the intermediate elongation Eb of the carcass cord at the height position of the outermost end of the bead core in the radial direction of the tire. Therefore, it is possible to sufficiently exhibit the performance as the carcass cord, and to enhance the load supporting ability of the carcass. As a result, the lateral rigidity and the cornering power can be enhanced without increasing the tire weight. Since the vertical rigidity can be prevented from increasing, it is possible to prevent the riding comfort and the road noise performance from being deteriorated.

Especially when the ratio (Es/Eb) of the intermediate elongations is set in a range of 0.7 to 0.9, the basic performance of the tire can be enhanced in excellent balance.

When the height (ha) of the bead apex rubber is set to 0.3 to 1.0 times the height (h) of the maximum width position, the bead portion having high intermediate elongation can be reinforced appropriately by the bead apex rubber. As a result, the rigidity of the tire side portion is equalized, and deterioration of low frequency noise performance caused by this can be prevented.

Since the intermediate elongation Es is set small, even when the tire thickness Ts at the maximum width position is made relatively thin as thin as 30 to 67% of the tire thickness Tb at the height position of the outermost end of the bead core in the radial direction of the tire, difference in rigidities is less prone to be generated in the side portion of the tire, and it is possible to further prevent the noise from being deteriorated, and to reduce the rolling resistance.

What is claimed is:

1. A pneumatic tire, comprising a carcass including a carcass ply having a ply body portion which extends from a tread portion to a bead core of a bead portion through a sidewall portion and which is continuously provided with a ply folded-up portion folded up around the bead core from its inner side to its outer side in the tire axial direction, wherein
an intermediate elongation Es of a carcass cord in the ply body portion at a maximum width position where the ply body portion projects most outward in a tire axial direction is smaller than an intermediate elongation Eb at a height position of a radially outermost end of the bead core.

2. The pneumatic tire according to claim 1, wherein a ratio (Es/Eb) of the intermediate elongation Es at the maximum width position and the intermediate elongation Eb at the height position of the outermost end is higher than 0.7 and smaller than 0.9.

3. The pneumatic tire according to claim 1 or 2, wherein the ratio (Es/Eb) of the intermediate elongation Es at the maximum width position and the intermediate elongation Eb at the height position of the outermost end is in a range of 0.75 to 0.85.

4. The pneumatic tire according to claim 1, wherein a bead apex rubber extending radially outward of the tire from a radially outer surface of the bead core is disposed in the bead portion, a height (ha) of the bead apex rubber from a bead base line is 0.3 to 1.0 times a height (h) from the bead base line to the maximum width position.

5. The pneumatic tire according to claim 1, wherein a tire thickness Ts of the sidewall portion at the maximum width position of the carcass ply is 30 to 67% of a tire thickness Tb of the bead core at the height position of the outermost end.

6. The pneumatic tire according to claim 1, wherein the carcass cord is a polyester cord, the intermediate elongation Es is 3.0 to 5.0%.

7. The pneumatic tire according to claim 1, wherein the tread portion is provided with a belt layer radially outward of the carcass, and a ratio (Ef/Es) of an intermediate elongation Ef of the carcass cord at a position of an outer end of the belt layer and an intermediate elongation Es at the maximum width position is 0.6 to 0.95.

8. The pneumatic tire according to claim 7, wherein a ratio (Ef/Es)/(Es/Eb) of the ratio (Ef/Es) and the ratio (Es/Eb) is 0.80 to 1.20.

* * * * *